United States Patent [19]

Born et al.

[11] Patent Number: 4,708,234

[45] Date of Patent: Nov. 24, 1987

[54] ARRANGEMENT FOR CONVERTING A MULTI-TRACK STREAM OF BOTTLES INTO A SINGLE-TRACK STREAM OF BOTTLES

[75] Inventors: Gerhard Born, Bingen; Klaus Kaiser, Neu-Bamberg, both of Fed. Rep. of Germany

[73] Assignee: Seitz Enzinger Noll Maschinenbau Aktiengesellschaft, Mannheim, Fed. Rep. of Germany

[21] Appl. No.: 776,018

[22] Filed: Sep. 13, 1985

[30] Foreign Application Priority Data

Sep. 15, 1984 [DE] Fed. Rep. of Germany ....... 3433920
Dec. 13, 1984 [DE] Fed. Rep. of Germany ....... 3445543

[51] Int. Cl.$^4$ ............................................. B65G 47/12
[52] U.S. Cl. .................................................... 198/453
[58] Field of Search ............... 198/453, 452, 448, 434, 198/599, 636, 600, 419, 425, 443, 415, 453, 454

[56] References Cited

U.S. PATENT DOCUMENTS

| | | | |
|---|---|---|---|
| 2,237,345 | 4/1941 | Frentzel, Jr. et al. | 198/600 |
| 3,117,665 | 1/1964 | Nekola et al. | 198/453 |
| 3,633,728 | 1/1972 | Chamberlin | 198/448 |
| 4,273,237 | 6/1981 | Wahl et al. | 198/445 |
| 4,489,820 | 12/1984 | Schneider | 198/448 |

Primary Examiner—Robert J. Spar
Assistant Examiner—D. Glenn Dayoan
Attorney, Agent, or Firm—Becker & Becker, Inc.

[57] ABSTRACT

An arrangement for converting a multi-track stream of bottles to a single-track stream of bottles. An intermediate conveyer is disposed between a feeding mechanism, which is provided with guide rails, and a withdrawal mechanism, which is provided with guide rails. The upper sides of the conveyer belts of the intermediate conveyer form a conversion region in which the conveyer belts are disposed flushly adjacent one another in the shape of an inclined plane which is inclined transverse to the direction in which bottles are conveyed from the upper side of the feeding mechanism to the upper side of the withdrawal mechanism. The conversion region is formed by the upper sides of the conveyer belts of the intermediate conveyer and of the withdrawal mechanism. The track width of the conversion region corresponds to the track width of the heating mechanism, with the conversion region being disposed downstream of the feeding mechanism and essentially coinciding in level and track with the latter. The conversion region is provided with a linear guide rail.

15 Claims, 8 Drawing Figures

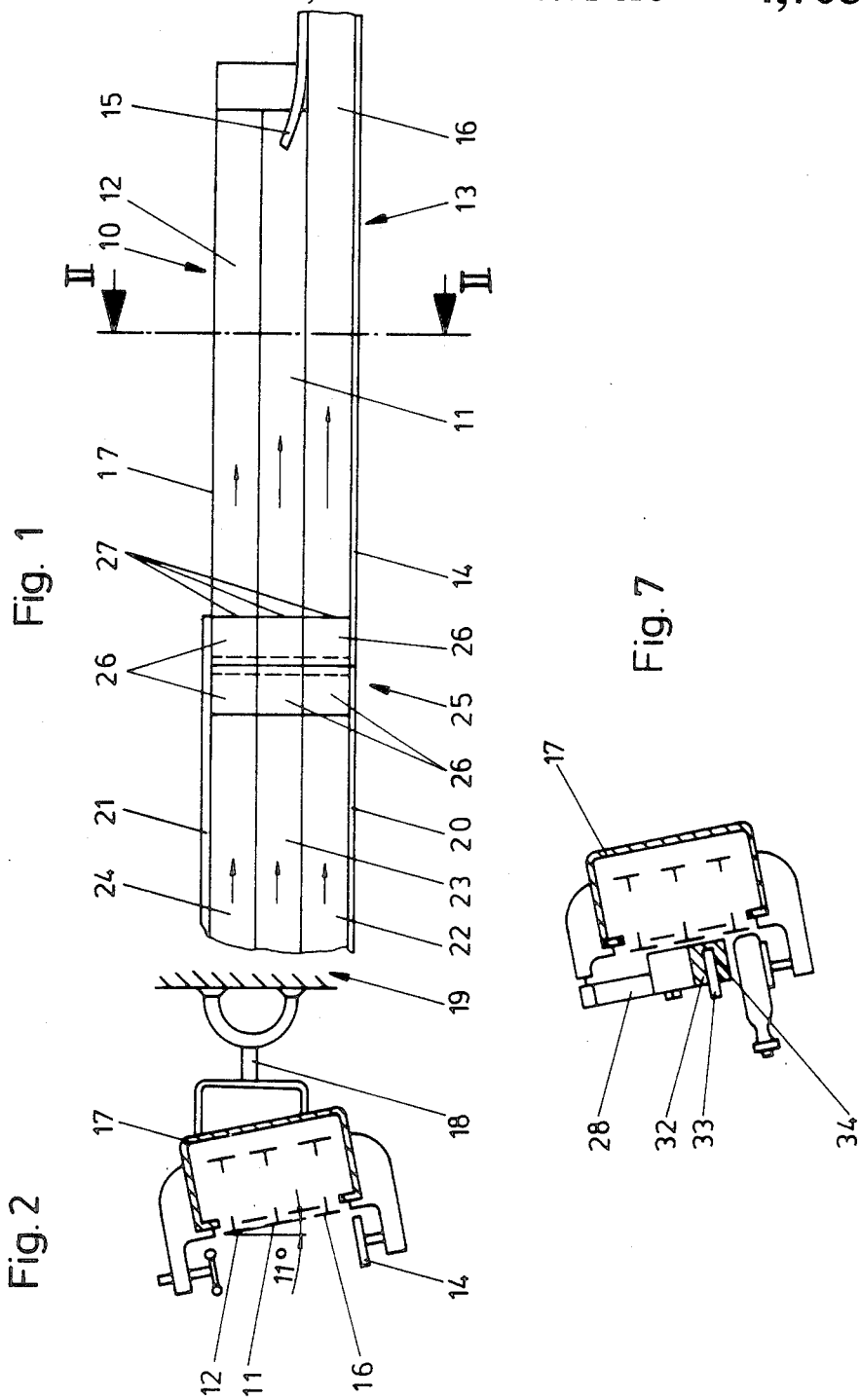

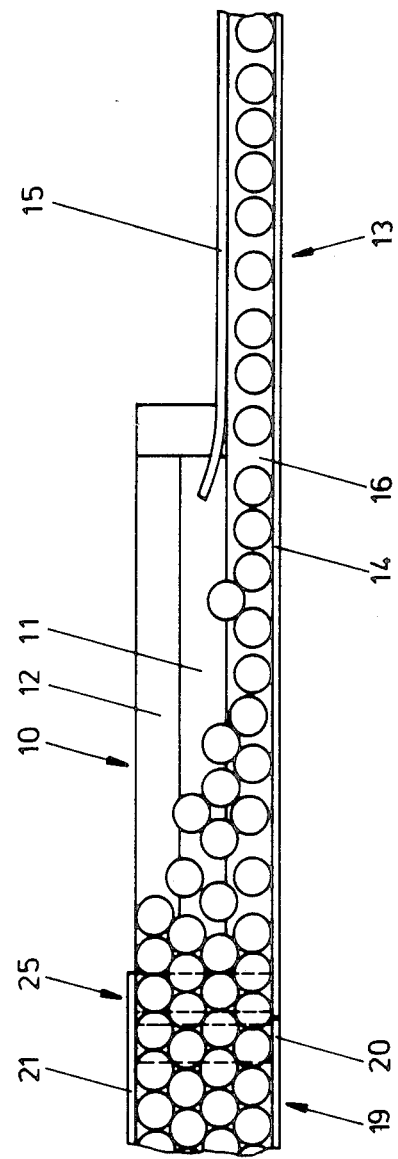
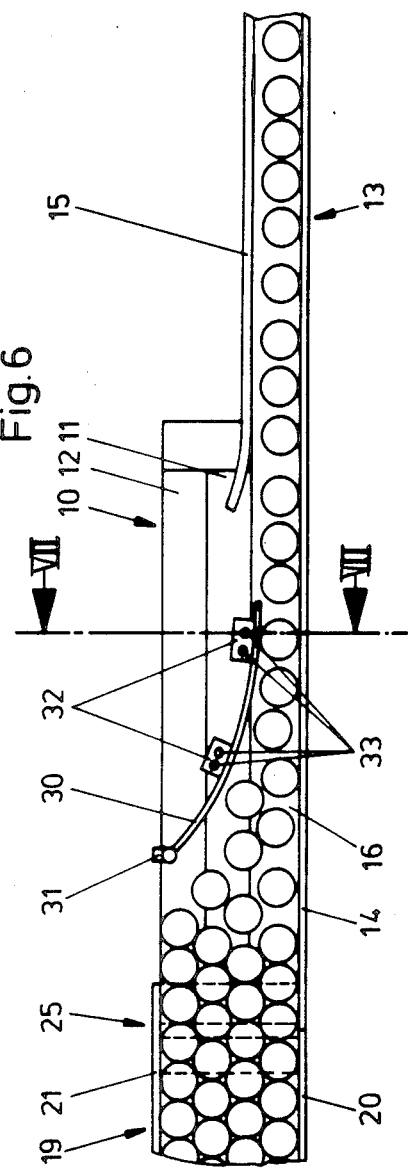

ARRANGEMENT FOR CONVERTING A MULTI-TRACK STREAM OF BOTTLES INTO A SINGLE-TRACK STREAM OF BOTTLES

BACKGROUND OF THE INVENTION

1. Field of the Invention

The present invention relates to an arrangement for converting a stream of bottles delivered as a multi-track or width stream into a stream of bottles which is to be withdrawn as a single-track stream; an intermediate conveyer is disposed between a feeding mechanism, which is provided with first guide means; and a withdrawal mechanism, which is provided with second guide means; the upper sides or runs of the conveyer belts of the intermediate conveyer form a conversion region, with the conveyer belts being at least partially flush with, and next to, one another, and being in the shape of an inclined plane which is inclined transverse to the direction in which bottles are conveyed from the upper side of the feeding mechanism to the upper side of the withdrawal mechanism, whereby those guide means of the feeding mechanism and of the withdrawal mechanism of the low-lying side of the inclined plane are interconnected.

2. Description of the Prior Art

An arrangement of this general type is disclosed in German Offenlegungsschrift 32 02 991. In this known arrangement, the wide stream of bottles delivered on the multi-track feeding mechanism is converted to a single-track stream of bottles, which is to be withdrawn, under the influence of the intermediate conveyer, which serves as an acceleration section and comprises a plurality of parallel conveyer belts which rotate at varied speeds. The single-track stream of bottles, in turn, passes from the intermediate conveyer onto the single-track withdrawal mechanism, which then feeds the bottles to a bottle handling machine, such as a filling machine or a labeling machine.

In order to effect the conversion in this heretofore known arrangement, the upper sides of the parallel conveyer belts of the feeding mechanism, the intermediate conveyer, and the withdrawal mechanism are offset relative to one another in the conveying direction, and are embodied as an inclined plane which extends transverse to the transport direction of the conveyer belts. At the upper longitudinal side of the intermediate conveyer, upstream relative to the transport direction of its conveyer belts, the introduction of the bottles is diagonally offset relative to the multi-track feeding mechanism, and on the opposite lower longitudinal side of the intermediate conveyer, downstream relative to the transport direction, the bottle withdrawal is offset relative to the single-track withdrawal mechanism. At least in the region of the bottle introduction and of the bottle withdrawal, the transport surfaces of the feeding mechanism and of the withdrawal mechanism have the same slope as do the upper sides of the conveyer belts of the intermediate conveyer, which form the inclined plane, whereby the angle of inclination of the plane which extends transverse to the transport direction is such that the bottles of the wide stream of bottles from the feeding mechanism slide down, under the effect of gravity, from the feeding mechanism, over the intermediate conveyer, to the withdrawal mechanism, without tipping over in doing so. During this downward movement, the bottles are initially supported against one another; as acceleration due to the conveyer belts continues, the bottles are individually supported against a guide rail, the guide surface of which is disposed at right angles to the inclined plane, and extends at an angle over the intermediate conveyer. However, for this purpose it is necessary to have a side guide rail which faces the feeding mechanism, and which connects the guide rail of the feeding mechanism and the remote side guide rail of the withdrawal mechanism. In the transfer regions to the respective side guide rails, the initially mentioned guide rail has respective curves which have different directional paths.

This heretofore known arrangement has the critical drawback that the guide rails for supporting the stream of bottles requires respective curved sections not only in the region of the transfer of the bottles from the feeding mechanism to the intermediate conveyer, but also in the region of the transfer of the bottles from the intermediate conveyer to the single-track withdrawal mechanism; these curved sections form resistances which disturb the stream of bottles. Such a so-called staggered curve forces two changes in direction upon the stream of bottles which are to be supported; at high conveying capacities, only stable bodies can follow these changes in direction. Furthermore, each change in direction effects instability in the stream of bottles, and triggers therein redistributions which lead to the development of greater noise. Aside from the fact that a guide rail produced from the two curved sections is expensive to produce, this forced guidance for converting the wide stream of bottles to a single-track stream of bottles requires a relatively long section for the feeding mechanism and the intermediate conveyer in order to enable the reliable downward guidance of the stream of bottles over the inclined plane. The structural expense and space required for this are further drawbacks of the heretofore known arrangement. Finally, the previously described varied speed of the conveyer belts of the intermediate conveyer requires an increased expense for drive mechanisms and control units.

An object of the present invention is to provide an arrangement of the aforementioned general type which makes it possible, without using force, to convert a wide, multi-track stream of bottles delivered by conveyer belts to a singletrack stream of bottles which is to be withdrawn, with said inventive arrangement eliminating the guide rail which extends from the feeding mechanism over the intermediate conveyer to the withdrawal mechanism and forms a forced guidance, and with said arrangement also reducing the structural expense by having shorter sections than previously provided and also by requiring less space, and also reducing the expense for control mechanisms.

BRIEF DESCRIPTION OF THE DRAWINGS

This object, and other objects and advantages of the present invention, will appear more clearly from the following specification in conjunction with the schematic drawings, in which:

FIG. 1 is a plan view of one inventive arrangement for converting rows of bottles;

FIG. 2 is a cross-section taken along the line II—II in FIG. 1;

FIG. 6 shows the arrangement of FIG. 1 with a counter-rail disposed downstream of the transition mechanism of FIG. 3;

FIG. 7 is a cross-section of the counter-rail of FIG. 6 taken along the line VII—VII thereof; and FIG. 8 shows the configuration of a stream of bottles in an arrangement having the transition mechanism of FIG. 3.

SUMMARY OF THE INVENTION

Figure 4:
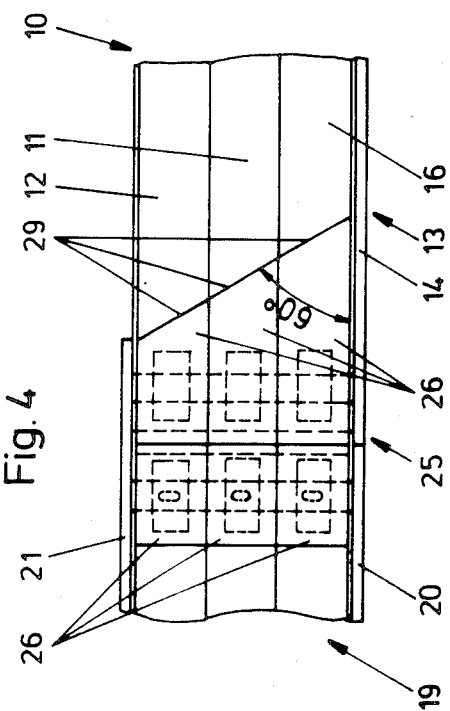
FIG. 4 shows a planar transition mechanism which is disposed at the same level as the parts upstream and downstream therefrom and has glide plates having transfer edges which are embodied as diagonals.

The arrangement of the present invention is characterized primarily in that the upper side of the conveyer belt of the withdrawal mechanism, and the upper sides of the conveyer belts of the intermediate conveyer, form the conversion region, the track width of which corresponds to the track width of the feeding mechanism and is disposed downstream of the latter, in the conveying direction, and essentially coincides in level and track with the feeding mechanism, and in that the guide rail associated with the conversion region linearly connects those guide rails of the feeding and withdrawal mechanisms which are adjacent one another in the conveying direction.

As a result of the inventive solution, which essentially provides for the direct feeding of the delivered wide stream of bottles to the intermediate conveyer and the withdrawal mechanism in the transport direction thereof, the forced downward movement required with the heretofore known arrangement for converting the delivered wide stream of bottles is eliminated at the curved guide rail, and at the same time this type of guide rail is entirely eliminated. To reduce the structural expense, and the space required, the transport section of the feeding mechanism adjacent to the intermediate conveyer is thereby also eliminated; this transport section of the feeding mechanism was previously required as the conversion section. Also eliminated is the unused transport surface of the intermediate conveyer on the back side of the guide rail.

Pursuant to a specific embodiment of the present invention, the conveyer belts of the withdrawal mechanism and of the intermediate conveyer are endless belts, each of which has an upper and lower side with a return from the upper side to the lower side and a return from the lower side to the upper side; that return of the withdrawal mechanism from the lower side to the upper side thereof is disposed in the vicinity of that return of the intermediate conveyer from the lower side to the upper side thereof, so that that conveying surface of the withdrawal mechanism adjacent to the intermediate conveyer forms the common conversion region with the upper sides of the conveyer belts of the intermediate conveyer; the feeding mechanism also includes conveyer belts which are endless belts having an upper side and a lower side with a return from the upper side to the lower side and a return from the lower side to the upper side; when viewed in the direction in which bottles are conveyed by the intermediate conveyer, that return of the feeding mechanism from the upper side to the lower side is disposed upstream of those returns of the intermediate conveyer and of the withdrawal mechanism from the lower side to the upper side; the upper sides of the conveyer belts of the feeding mechanism conform to the inclination of the common transport surface of the conversion region in such a way that the low-lying sides of the feeding mechanism and the withdrawal mechanism are aligned with one another to effect the linear connection of the guide rails of the feeding mechanism and withdrawal mechanism; also included is an essentially planar transition mechanism which is disposed in the transition region from the upper sides of the conveyer belts of the feeding mechanism to the common conversion region, with the transition mechanism also being essentially coplanar with the upper sides of the conveyer belts of the intermediate conveyer and with the common conversion region.

Further advantageous features and embodiments of the present invention will be described subsequently.

DESCRIPTION OF PREFERRED EMBODIMENTS

Referring now to the drawings in detail, the embodiment illustrated in FIG. 1 shows a portion of an intermediate transporter or conveyer 10 which forms a subsequently-to-be-described conversion region for bottles, which are indicated in FIGS. 5 to 8. The intermediate conveyer 10 comprises two conveyer belts 11, 12 which are disposed parallel and next to one another, and which rotate endlessly. Each of these conveyer belts 11, 12 comprises a jointed band chain, with the belts being driven by a non-illustrated drive mechanism. The conveyer belts 11, 12 are preferably disposed next to one another in such a way that no gap is formed between them. The upper sides or runs of the conveyer belts 11, 12 together form a transport surface in the shape of an inclined plane, which is inclined transverse to the transport direction of the conveyer belts 11, 12, expediently at an angle of 11° (FIG. 2).

A single-track withdrawal mechanism 13 is associated with the intermediate conveyer 10, which can comprise further conveyer belts. The withdrawal mechanism 13 is provided on the sides with guide means 14, 15, and has a conveyer belt 16 which rotates in the direction of transport of the intermediate conveyer 10. The withdrawal mechanism 13, which leads to a non-illustrated bottle handling machine, for example a filling machine or a labeling machine, has the transport surface of its conveyer belt 16 disposed parallel to the upper side of the lower conveyer belt 11 of the intermediate conveyer 10. At least in the region of the intermediate conveyer 10, the conveyer belt 16 conforms to the angle of inclination of the inclined plane, and forms a common transport surface with the upper side of the intermediate conveyer 10. The returns from the under side to the upper side of both the withdrawal mechanism 13 and the intermediate conveyer 10 end in the same region. That region of the conveyer belt 16 which has the transport surface that conforms to the inclined plane of the intermediate conveyer 10 is expediently mounted together with the conveyer belts 11, 12 of the intermediate conveyer 10 in a support 17 which also receives the returns of the intermediate conveyer 10 and of the withdrawal mechanism 13 from their under sides to their upper sides, and is supported by legs 18 on a surface.

In place of the two conveyer belts 11, 12, the intermediate conveyer 10 can also be provided with a single conveyer belt, the width of which corresponds to the width of the feeding mechanism 19, reduced by the width of the conveyer belt of the withdrawal mechanism 13.

The conveyer belts 11 and 12 of the intermediate conveyer 10 can either be operated at the same speed, or can also be operated at varied speeds. Similarly, the conveyer belt 16 of the withdrawal mechanism 13 can be operated at a different, and especially at a higher speed than that of the conveyer belt or belts of the intermediate conveyer 10. However, it is also possible to rotate the conveyer belt 16 at the same speed as the belts of the intermediate conveyer.

Furthermore, the withdrawal mechanism 13 can also comprise two non-illustrated conveying means which rotate at varying speeds, with one of the conveying means including a conveyer belt which is provided with the withdrawal mechanism transport surface that conforms to the inclined plane of the intermediate conveyer, and with the other conveying means, which is downstream of the intermediate conveyer 10 and is disposed parallel to the first conveying means, having a conveyer belt which operates at greater speed and advances the bottles to the non-illustrated bottle handling machines.

Of the two guide means 14, 15 of the withdrawal mechanism 13, that guide means 15 which is adjacent to the intermediate conveyer 10 extends into the end region of the latter. That guide means 14 which is remote from the intermediate conveyer 10 extends along the low-lying longitudinal side of the support 17, and ends at that end of the support in the region of the return of the withdrawal mechanism 13 from the under side to the upper side.

Disposed upstream of the intermediate conveyer 10 when viewed in the direction of transport is the previously mentioned feeding mechanism 19, with its return from the upper side to the lower side being associated with the return of the intermediate conveyer 10 and the withdrawal mechanism 13 from the under side to the upper side. The feeding mechanism 19 is also provided on the sides with guide means 20, 21, and is furthermore provided with a plurality of parallel conveyer belts which rotate in the transport direction of, and have a common transport surface with, the upper sides of the intermediate conveyer 10 and withdrawal mechanism 13. These conveyer belts of the feeding mechanism 19 expediently comprise jointed band chains and have upper sides which form a planar transport surface that conforms to the inclination of the common transport surface of the intermediate conveyer 10 and withdrawal mechanism 13. In the illustrated embodiment, three such conveyer belts 22, 23, 24 are provided for the feeding mechanism 19, which is preferably embodied as a dosing section, and is also supported on a surface by means of the legs 18. In this connection, the low-lying longitudinal sides of the feeding mechanism 19 and of the withdrawal mechanism 13 are aligned with one another, with that guide means 14 which extends on the low-lying longitudinal side of the withdrawal mechanism 13 being connected to that guide means 20 which extends on the low-lying longitudinal side of the feeding mechanism 19. The guide means 14 and 20 are arranged high enough that any bottles which have fallen over onto the common transport surface can pass underneath these guide means and can be removed. Furthermore, the high guide means 21 is adjustable in a manner known per se. An essentially planar transition mechanism 25 is provided in the region of transition from the upper side of the feeding mechanism 19 to the common transport surface of the intermediate conveyer 10 and the withdrawal mechanism 13. In a simple case, the transition mechanism 25 is made of one piece or, as illustrated in FIG. 1, it can comprise a plurality of square or rectangular glide plates 26 which are respectively disposed above a return of the feeding mechanism 19 to the under side as well as above a return of the intermediate conveyer 10 to the upper side and above the return of the withdrawal mechanism 13 to the upper side. With regard to those glide plates 26 disposed above the return of the intermediate conveyer 10 and the return of the withdrawal mechanism 13, the straight edge of the plate at the transfer side can be embodied as a double tongue 28 (FIG. 3) to provide for a reliable transfer of the bottles onto the intermediate conveyer 10 and the withdrawal mechanism 13. This purpose can also be served by the glide plates 26 illustrated in FIG. 4; the transfer side of these glide plates 26 is provided with a diagonal 29, with the diagonals 29 of all of the glide plates 26 together forming a straight line. This straight line extends transverse to the direction of movement of the conveyer belts 11, 12, 16 of the intermediate conveyer 10 and the withdrawal mechanism 13, with an angle of 60° to 65° being formed between the diagonal 29 which forms the respective transfer edge, and the low-lying or high longitudinal side of the respective glide plate 26; an angle of 65° is preferred.

Figure 5:
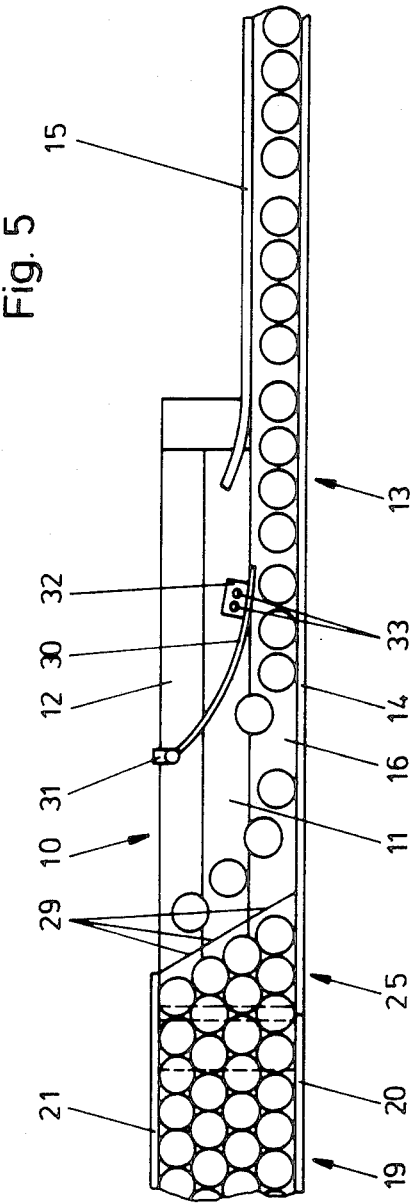
FIG. 5 shows the arrangement of FIG. 1 with a counter-rail disposed downstream of the transition mechanism of FIG. 4.

Pursuant to the further inventive embodiment illustrated in FIG. 5, there is provided downstream of the essentially planar transition mechanism 25 a counter-rail 30 is provided which acts under the effect of a force upon the stream of bottles in the direction toward the guide means or guide rail 14 of the withdrawal mechanism 13. One end of the counter-rail 30 at the high longitudinal side of the intermediate conveyer 10, is pivotably connected to the support 17 by means of a hinge 31 or the like. The opposite free end of the counter-rail 30 is guided to or into the transportation path of the single-track stream of bottles of the withdrawal mechanism 13 to reduce the gap to the guide rail 14. The counter-rail 30 is made of elastic synthetic material, such as polyethylene, and has, for example, a rectangular cross-section of 75 mm×5 mm. The force which acts upon the counter-rail 30 is exerted by one or more weights 33 which are mounted in a shoe 32 that is attached to the free end of the counter-rail 30 and is preferably made of synthetic material. The shoe 32 slides upon the common transport surface of the intermediate conveyer 10 and the withdrawal mechanism 13, thus supporting the counter-rail 30. A rail embodiment of this type with a shoe 32 is, for example, sufficient when glide plates 26 having the diagonal 29 are used. Depending upon the requirements, two or more shoes 32 which are spaced from one another on the counter-rail 30 can be provided in order to provide additional effective forces at a number of locations of the counter-rail 30. This is necessary, for example, with a planar transition mechanism having glide plates 26 which on the transfer side are embodied as double tongues 28, with use thereof entailing the requirement of having a number of bottles being placed in a single row from the counter-rail 30 in the single-track stream of bottles which is formed (FIG. 6). The respective exchangeable weight 33 is preferably in the form of an element having a round cross-section, with the shoe 32 being provided with an appropriate bore 34 for receiving the weight 33 (FIG. 7).

In the overall construction of the inventive arrangement, the non-illustrated drive mechanisms for the conveyer belts 11, 12, 16, 22–24 of the intermediate conveyer 10, the withdrawal mechanism 13, and the feeding mechanism 19 are adjustable, so that not only can the speed of the conveyer belts 16, 22–24 of the feeding mechanism 19 and withdrawal mechanism 13 be adapted to the quantity of bottles which are to be removed from the respective bottle handling machine, but the speed of the conveyer belts 11, 12 of the intermediate conveyer 10 can also be adjustable so as either to be the same or to vary relative to one another in conformity to the respective requirements. Thus, for example, the bottles conveyed from the feeding mechanism 19 at low speed can be carefully accelerated to the withdrawal speed of the withdrawal mechanism 13, which is considerably higher than the feed speed. The transfer or conversion is undertaken in a particularly careful manner when the speed of rotation of the conveyer belts 11 and 12 of the intermediate conveyer 10, and the conveyer belt 16 of the withdrawal mechanism 13, are operated at the same speed.

Figure 3:
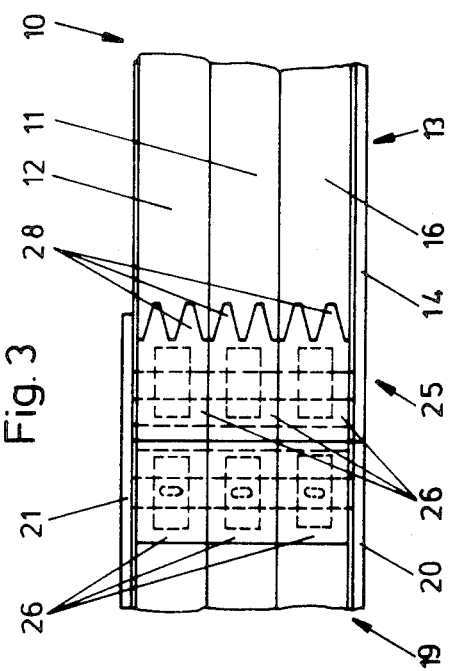
FIG. 3 shows a planar transition mechanism which is at the same level as the parts upstream and downstream therefrom, and is provided with glide plates having tongue-like transfer edges.

If after appropriate adjustment of the speeds of the belts of the intermediate conveyer 10, the withdrawal mechanism 13, and the feeding mechanism 19, a wide, i.e. multi-track, stream of bottles is conveyed onto the feeding mechanism, then in the embodiment illustrated in FIGS. 1 and 3, the continuously transported bottles are transferred, in the manner illustrated in FIG. 8, via the planar transition mechanism 25 onto the conveyer belts 11, 12, 16 of the withdrawal mechanism 13 and the intermediate conveyer 10. The bottles thereby passing onto the conveyer belt 16 of the withdrawal mechanism 13 are accelerated by the action of the conveyer belt 16, and are either spread somewhat apart, or are merely withdrawn. The bottles transferred onto the intermediate conveyer 10 are aligned in a single row in the gaps thus formed between the bottles on the withdrawal mechanism 13. In particular, this alignment takes place essentially under the effect of the downward sloping pressure or also under the additional effect of the conveyer belts 11, 12, which vary in speed relative to one another. In this way, already after a short transport section there is formed at the guide rail 14 a single-track stream of bottles which is conveyed onto the conveyer belt 16. If with the previously described formation of the single-track stream of bottles, bottles which are not completely aligned in the stream of bottles reach the region of the withdrawal mechanism 13, which is provided with the guide rails 14, 15 on both sides, and causes disturbances in that location, the counter-rail 30 illustrated in FIG. 6 can be provided. This counter-rail 30 acts under the influence of the weights 33 on the single-track stream of bottles which is being formed, and aligns these bottles into the single-track stream of bottles.

In the embodiment of FIGS. 1 and 4, the single track stream of bottles is formed in the manner illustrated in FIG. 5 of short individual rows which are successively transferred over the planar transition mechanism 25. In the illustrated embodiment, each of these individual rows comprises four bottles which are basically not spaced from one another. In the transported wide stream of bottles, these individual rows are automatically formed on the feeding mechanism 19 in respective inclined orientations of 60° to the direction of transport when the guide means or guide rails 21 and 20 are spaced from one another in such a way that their spacing conforms to four longitudinal rows of tightly packed bottles oriented in the conveying direction. As the individual rows in this arrangement are transferred over the transition mechanism 25, the bottles of a given individual row experience, as they pass the diagonals 29 of the glide plates 26, not only different accelerations due to the varying speeds of the conveyer belts 11, 12, 16 of the intermediate conveyer 10 and the withdrawal mechanism 13, but also a simultaneous downward pressure effect. As a result, the bottles of the individual rows become spaced from one another, with the three upper bottles sliding in the direction toward the guide rail 14 and following, in a row, the lower bottle which upon transfer is already on the conveyer belt 16 of the withdrawal mechanism 13. When the last bottle of this individual row comes to rest against the guide rail 14, the following individual row forms in the above-described manner, so that individual rows continuously pass onto the withdrawal mechanism 13 while producing the least possible amount of noise, and are fed as a single-track row of bottles to the subsequent bottle handling machine.

Also with this embodiment the counter-rail 30 illustrated in FIG. 5 can be used, with the counter-rail 30 being embodied and disposed in the manner previously described, and working in the same manner on the stream of bottles which is formed to supply thereto those bottles which have not aligned themselves in a single row.

As can be seen from the previous description, the feature common to all of the embodiments is that the upper sides of the conveyer belts of the intermediate conveyer and of the withdrawal mechanism form the initially described conversion region which is substantially in the same plane with the upper sides of the conveyer belts of the feeding mechanism.

The present invention is, of course, in no way restricted to the specific disclosure of the specification and drawings, but also encompasses any modifications within the scope of the appended claims.

What we claim is:

1. An arrangement for converting a stream of bottles delivered as a multi-track stream into a transitional stream of bottles which is to be withdrawn as only a single-track stream; an intermediate conveyer is disposed between a feeding mechanism, which is provided with first guide means, and a withdrawal mechanism, which is provided with second guide means; the upper sides of the conveyer belt system of said intermediate conveyer form a conversion region in common therewith that includes a common transport surface and that is in the shape of an inclined plane which is inclined transverse to the direction in which bottles are conveyed from the upper side of said feeding mechanism to the upper side of said withdrawal mechanism having a conveying surface therewith, whereby those guide means of said feeding and withdrawal mechanisms of the low-lying side of said inclined plane are interconnected;

the improvement wherein said withdrawal mechanism includes a conveyer belt having an upper side, with said inclined plane conversion region being formed by the combination of said upper side of said conveyer belt system of said intermediate conveyer in part, and said upper side of said conveyer belt of said withdrawal mechanism in part; said conversion region has a track width which corresponds to the track width of said feeding mechanism, is disposed downstream of the later when viewed in the direction in which said bottles are conveyed, and has its plane essentially coincide in level and track stream with said feeding mechanism; that portion of that second guide means of said withdrawal mechanism which is disposed in said conversion region provides for a linear connection of said guide means of said feeding and withdrawal mechanisms of the low-lying side of said inclined plane conversion region for automatic and pressureless sloped-down-driving-away of the bottles in only the single-track stream;

said conveyer belt of said withdrawal mechanism being an endless belt, and said conveyer belt system of said intermediate conveyer being an endless belt system, each of which has an upper and lower side with a return from the upper side to the lower side, and a return from the lower side to the upper side; that return of said withdrawal mechanism from the lower side to the upper side thereof being disposed in the vicinity of that return of said intermediate conveyer from the lower side to the upper side thereof, so that that conveying surface of said withdrawal mechanism adjacent to said intermediate conveyer forms said common conversion region with said upper sides of said conveyer belt system of said intermediate conveyer; said feeding mechanism also including a conveyer belt system which is an endless belt system having an upper side and a lower side with a return from the upper side to the lower side, and a return from the lower side to the upper side; when viewed in the direction in which said bottles are conveyed by said intermediate conveyer, that return of said feeding mechanism from the upper side to the lower side being disposed upstream of those returns of said intermediate conveyer and said withdrawal mechanism from the lower side to the upper side; the upper sides of said conveyer belt system of said feeding mechanism conform to the inclination of the common transport surface of said conversion region in such a way that the low-lying sides of said feeding and withdrawal mechanisms are aligned with one another to effect said linear connection of said guide means of said feeding and withdrawal mechanisms; and an essentially planar transition mechanism which is disposed in the transition region from the upper sides of said conveyer belt system of said feeding mechanism to said common conversion region, with said transition mechanism also being essentially coplanar with the upper sides of said conveyer belt system of said intermediate conveyer, and with the upper side of said conveyer belt of said withdrawal mechanism.

2. An arrangement according to claim 1, in which said planar transition mechanism comprises a plurality of glide plates, with a respective glide plate being disposed above each return of said feeding mechanism from the upper side to the lower side thereof, and above each return of said intermediate conveyer and said withdrawal mechanism from the lower side to the upper side.

3. An arrangement according to claim 2, in which each of said glide plates disposed above said returns of said intermediate conveyer and said withdrawal mechanism has a transfer edge which faces the direction of transport of said bottles, and which is embodied in the manner of a double tongue.

4. An arrangement according to claim 2, in which each of said guide plates disposed above said returns of said intermediate conveyer and said withdrawal mechanism has a transfer edge which faces the direction of transport of said bottles, and which is embodied as a diagonal line which extends at an angle of 60° to 65° to the transport direction of said conveyer belt of said withdrawal mechanism and said conveyer belt system of said intermediate conveyer; said diagonal lines of said glide plates together form a straight line.

5. An arrangement according to claim 4, in which said diagonal lines extend at an angle of 65°.

6. An arrangement, according to claim 2, which includes a support for said intermediate conveyer, and a counter-rail which is disposed downstream of said planar transition mechanism and opposite said second guide means of the low-lying side of said withdrawal mechanism; said counter-rail is made of elastic synthetic material, and has two ends, one of which is pivotably connected to the high side of said support; said counter-rail is under the influence of a force, with its other, free end extending at least to the transport path of said single-track stream of bottles of said withdrawal mechanism for reducing the distance to said second guide means of the low-lying side of said withdrawal mechanism.

7. An arrangement according to claim 6, in which said counter-rail is connected to said support in the region of that guide means of said feeding mechanism opposite said low-lying guide means thereof.

8. An arrangement according to claim 1, in which said conveyer belt system of said intermediate conveyer comprises two conveyer belts that rotate at the same speed.

9. An arrangement according to claim 1, in which said conveyer belt system of said intermediate conveyer, and said conveyer belt of said withdrawal mechanism, rotate at the same speed.

10. An arrangement according to claim 1, in which said conveyer belt system of said intermediate conveyer comprises two conveyer belts that rotate at varied speeds.

11. An arrangement according to claim 1, in which said conveyer belt system of said intermediate conveyer comprises a single conveyer belt, the width of which corresponds to the width of said feeding mechanism less the width of said conveyer belt of said withdrawal mechanism.

12. An arrangement for converting a stream of bottles deliverd as a multi-track stream into a stream of bottles which is to be withdrawn as a single-track stream; an intermediate conveyer is disposed between a feeding mechanism, which is provided with first guide means, and a withdrawal mechanism, which is provided with second guide means; the upper sides of the conveyer belt system of said intermediate conveyer form a conversion region that is in the shape of an inclined plane which is inclined transverse to the direction in which bottles are conveyed from the upper side of said feeding mechanism to the upper side of said withdrawal mechanism, whereby those guide means of said feeding and withdrawal mechanisms of the low-lying side of said inclined plane are interconnected;

the improvement wherein said withdrawal mechanism includes a conveyer belt having an upper side, with said inclined plane conversion region being formed by the combination of said upper side of said conveyer belt system of said intermediate conveyer, and said upper side of said conveyer belt of said withdrawal mechanism; said conversion region has a track width which corresponds to the track width of said feeding mechanism, is disposed downstream of the latter when viewed in the direction in which said bottles are conveyed, and has its plane essentially coincide in level and track with said feeding mechanism; that portion of that second guide means of said withdrawal mechanism which is disposed in said conversion region provides for a linear connection of said guide means of said feeding and withdrawal mechanisms of the low-lying side of said inclined plane conversion region; said conveyer belt of said withdrawal mechanism being an endless belt, and said conveyer belt system of said intermediate conveyer being an endless belt system, each of which has an upper and lower side with a return from the upper side to the lower side, and a return from the lower side to the upper side; that return of said withdrawal mechanism from the lower side to the upper side thereof is disposed in the vicinity of that return of said intermediate conveyer from the lower side to the upper side thereof, so that conveying surface of said withdrawal mechanism adjacent to said intermediate conveyer forms said common conversion region with said upper sides of said conveyer belt system of said intermediate conveyer; said feeding mechanism also includes a conveyer belt system which is an endless belt system having an upper side and a lower side with a return from the upper side to the lower side, and a return from the lower side to the upper side; when viewed in the direction in which said bottles are conveyed by said intermediate conveyer, that return of said feeding mechanism from the upper side to the lower side is disposed upstream of those returns of said intermediate conveyer and said withdrawal mechanism from the lower side to the upper side; the upper sides of said conveyer belt system of said feeding mechanism conform to the inclination of the common transport surface of said conversion region in such a way that the low-lying sides of said feeding and withdrawal mechanisms are aligned with one another to effect said linear connection of said guide means of said feeding and withdrawal mechanisms;

an essentially planar transition mechanism which is disposed in the transition region from the upper sides of said conveyer belt system of said feeding mechanism to said common conversion region, with said transition mechanism also being essentially coplanar with the upper sides of said conveyer belt system of said intermediate conveyer, and with the upper side of said conveyer belt of said withdrawal mechanism; said planar transition mechanism comprising a plurality of glide plates, with a respective glide plate being disposed above each return of said feeding mechanism from the upper side to the lower side thereof, and above each return of said intermediate conveyer and said withdrawal mechanism from the lower side to the upper side;

a support for said intermediate conveyer, and a counter-rail which is disposed downstream of said planar transition mechanism and opposite said second guide means of the low-lying side of said withdrawal mechanism; said counter-rail is made of elastic synthetic material, and has two ends, one of which is pivotably connected to the high side of said support; said counter-rail is under the influence of a force, with its other, free end extending at least to the transport path of said single-track stream of bottles of said withdrawal mechanisms for reducing the distance to said second guide means of the low-lying side of said withdrawal mechanism; said force which influences said counter-rail being a weight disposed on the latter, in the region of its free end, via the interposition of an intermediate member.

13. An arrangement according to claim 12, in which said intermediate member comprises a shoe which is connected to said counter-rail in the region of its free end, and which glides on said common transport surface of said conversion region; said shoe is provided with bore means for receiving said weight.

14. An arrangement according to claim 13, in which said counter-rail, in the region of its free end, is provided with two weights, with said shoe being provided with respective bore means for each of said weights.

15. An arrangement according to claim 13, in which said counter-rail is provided with at least one additional weight remote from said free end of said counter-rail; said weights are spaced from one another, and are disposed in respective shoes.

* * * * *